April 28, 1936. J. STICH 2,038,910

TAPE CUTTER

Filed Feb. 27, 1935

Inventor

John Stich

By Clarence A. O'Brien
Attorney

Patented Apr. 28, 1936

2,038,910

UNITED STATES PATENT OFFICE 2,038,910

TAPE CUTTER

John Stich, Oneida, N. Y.

Application February 27, 1935, Serial No. 8,559

1 Claim. (Cl. 206—59)

This invention relates to a cutter for tape wound on a spool such as adhesive tape, the general object of the invention being to provide a knife-carrying member which can be easily and quickly attached to the disks of the spool with the knife extending across the space between the disks, with means whereby the holder can be moved to any position on the spool to enable the knife to cut a length of tape of any desired size.

This invention also consists in certain other features of construction and in the combination and arrangement of several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
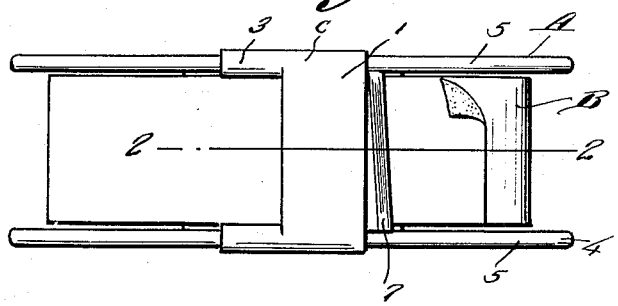
Fig. 1 is an edge view of a spool of tape showing the invention in position thereon.
Figure 4:
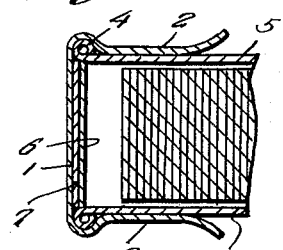
Fig. 4 is a section on line 4—4 of Fig. 3.

In this drawing, the letter A indicates a spool containing the tape B and the letter C indicates the knife holder. This holder is formed of a strip of bendable material having a reduced elongated central part 1 with its ends widened to provide the right angular extending parts 2, the portion between the parts 1 and 2 being rolled as shown at 3 to fit over the beads 4 on the disks 5 of the spool and in such manner that the holder can be moved to any desired position on the spool. The portion cut to make the central part 1 of reduced width is folded over as shown at 6 so that the parts 1 and 6 form a holder for a blade 7 which projects from the open end of the holder and I prefer to make the beveled edge of the knife slope as shown in Fig. 1. The parts 2 rest upon the outer faces of the two disks as shown in Fig. 4 and these parts help to hold the device in position and also provide finger holds for sliding the holder on the disks.

Figure 2:
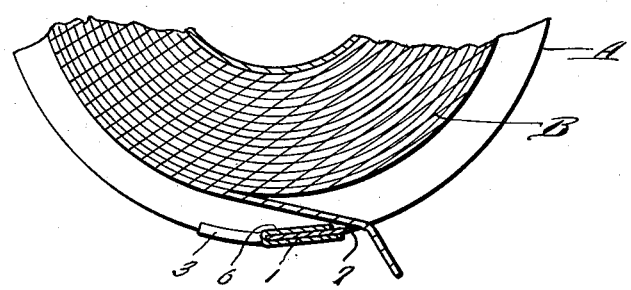
Fig. 2 is a section on line 2—2 of Fig. 1.
Figure 3:
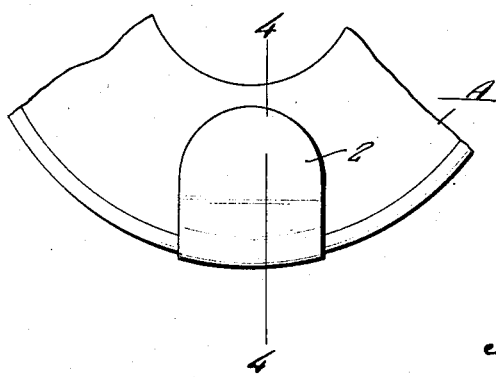
Fig. 3 is a fragmentary top plan view.

As will be seen from Figs. 1 and 2, the device can be adjusted to any desired place on the spool in accordance with the length of tape to be cut from the tape on the spool and then by drawing the tape against the knife or blade, the tape will be cut transversely.

When desired, the device can be formed of steel or the like with the front edge of the cross piece beveled to provide a cutting edge so that it will not be necessary to use the blade.

As will be seen, the device snugly fits a part of the spool so that the spool can be readily placed in the container in which it is sold.

It is thought from the foregoing description that the advantages and novel features of the invention will be readily apparent.

It is to be understood that changes may be made in the construction and in the combination and arrangement of the several parts, provided that such changes fall within the scope of the appended claim.

I claim:

In combination with a spool containing tape and including a pair of spaced disks, a member including a central portion and right angularly extending end portions, the central portion being of less width than the width of the end portions, said central portion extending across the space between the disks and the end portions contacting the outer faces of the disks with the free ends of said end portions turned outwardly away from the disks, the inner ends of the end portions and the parts where the end portions join the central portion being rolled and curved to engage the beads of the disks and a cutting edge carried by the central portion.

JOHN STICH.